United States Patent Office 3,240,769
Patented Mar. 15, 1966

3,240,769
PROCESS FOR OLEFINE POLYMERIZATION IN THE PRESENCE OF AN AGED CATALYST CONSISTING OF VANADIUM OXIDE, ALUMINUM HALIDE AND AN ARYLMERCURY COMPOUND
Peter Volans, Cardiff, Wales, assignor to Monsanto Chemicals Limited, London, England, a British company
No Drawing. Filed Oct. 7, 1960, Ser. No. 61,099
The portion of the term of the patent subsequent to Sept. 17, 1979, has been disclaimed
16 Claims. (Cl. 260—88.2)

This invention relates to the production of solid polymers and copolymers of ethylenically unsaturated hydrocarbons. More particularly, it relates to a novel process for the polymerization of ethylene or propylene.

A great deal of attention has been paid in recent years to the polymerization of ethylenically unsaturated hydrocarbons to form solid plastic materials, and especially to the polymerization of ethylene. The precise character of a polyethylene depends very much upon the conditions under which the ethylene is polymerized, and the optimum conditions for carrying out the polymerization have been the subject of much research work. The early processes did of course employ a high temperature of perhaps up to 300° C. and high pressure, for instance, in the region of 1200 atmospheres. These high pressure processes have been used for many years but more recently methods have become available in which owing to the use of extremely active catalysts milder polymerization conditions have been possible. In general, this means that lower operating pressures are effective, and consequently the use of an expensive high pressure plant can be avoided. Moreover, the resulting polyethylenes tend to have properties which are more desirable in certain applications than are the properties of conventional high pressure or thermal polyethylene; in particular the density is higher and the material is therefore more rigid. In a recent process, such polymers have been prepared at room temperature and at atmospheric pressure employing a catalyst system comprising a mixture of an aluminum halide, an arylmercury compound, and finely divided vanadium tetrachloride or pentoxide.

It has now been found that the efficacity of the aluminum halide, arylmercury compound, vanadium pentoxide catalyst system in the aforementioned process is significantly increased by "aging" the finely divided vanadium pentoxide in the presence of the monomer to be polymerized for at least 3 minutes before adding the remaining components of the catalyst system. The polymerization is effected in a liquid medium comprising a saturated straight-chain hydrocarbon or a saturated cyclic hydrocarbon.

The following examples are given in illustration of the invention and are not intended as limitations thereon.

Example I

This example describes the effect of omitting the "aging" step in preparing polyethylene; employing as catalyst a mixture of aluminum bromide, diphenylmercury and finely divided vanadium pentoxide (average particle size 0.7 micron).

In a 500 ml. round-bottom flask from which the air has been flushed out with a stream of ethylene there are introduced about 0.01 gram of the vanadium pentoxide; a solution of about 1 gram of aluminum bromide in 15 ml. of cyclohexane; and a solution of about 0.27 gram of diphenylmercury in 75 ml. of cyclohexane; the vanadium pentoxide remains suspended as particles in the solution. The flask is set up so that it can be agitated mechanically and at the same time remain connected to a source of ethylene at atmospheric pressure. The flask is maintained, amid vigorous agitation, at about 30° C.; as the polymerization proceeds pieces of solid polyethylene appear in the flask. At the end of three hours the supply of ethylene is cut off, and the contents of the flask are added to 500 cc. of an alcoholic hydrochloric acid solution obtained by mixing 1 volume of concentrated hydrochloric acid with 7 volumes of methanol and 2 volumes of ethanol. The mixture of polymer and the acid solution is boiled for a short time to ensure dissolution of the catalyst from the polymer, the mixture is cooled, and the polyethylene is then filtered off and dried under reduced pressure to remove residual water and organic solvents.

In this way, there is obtained about 3.5 grams of a solid polyethylene which has a density of about 0.940 (measured at 22° C.). This corresponds to a polymer yield of about 2.5 grams per gram of the total catalyst mixture.

Example II

This example corresponds to Example I except that the vanadium pentoxide is "aged" in the ethylene for varying periods prior to the addition of the aluminum bromide and the diphenylmercury.

In triplicate experiments, about 0.01 gram of the finely divided vanadium pentoxide employed in Example I is placed in each of three dry 500 ml. round-bottom flasks from which the air has been flushed with a stream of ethylene. The flasks are set up so that they can be mechanically agitated and at the same time remain connected to a source of ethylene at atmospheric pressure. The vanadium pentoxide is allowed to age in the presence of the ethylene in the flasks for periods of 3, 90, and 1370 minutes, respectively. After the requisite "aging" period has elapsed, solutions of 1 gram of aluminum bromide in 15 ml. of cyclohexane and of 0.27 gram of diphenylmercury in 75 ml. of cyclohexane are added, in that order, to each of the three flasks. The flasks are subsequently maintained, amid vigorous agitation, at 30° C. for about 3 hours, at which time the ethylene supply is cut off and the respective polymeric products recovered as in Example I.

The yields obtained employing the various "aging" periods are summarized in the following table and are there compared with the yield obtained in Example I wherein the "aging" step was omitted.

| Example | Aging period, min. | Yield of polymer per gram of total catalyst, gms. | Density at 22° C. |
|---|---|---|---|
| I | 0 | 2.5 | 0.957 |
| IIa | 3 | 5.4 | 0.940 |
| IIb | 90 | 7.3 | 0.950 |
| IIc | 1,370 | 13.4 | 0.940 |

These examples demonstrate that "aging" the vanadium pentoxide in ethylene for a period of as little as 3 minutes prior to addition of the remaining catalytic components more than doubles the effective yield of polymer obtained. Longer "aging" periods provide even greater yields.

The aluminum halide component of the catalyst mixture is preferably aluminum bromide although aluminum chloride is also highly effective. Aluminum flouride or iodide are satisfactory but are less preferred. A mixture of aluminum halides can be employed if desired.

The second component, the arlymercury compound, is a mercury derivative that contains at least one aryl group in which a carbon atom of the cyclic nucleus is linked to a mercury atom. Typical members are phenylmercurys and substituted phenylmercurys such as tolylmercurys, for example, diphenylmercury and di-(p-tolyl)-mercury. The arylmercury compounds may also contain other substituents in suitable instances, as in phenylmercurichloride and p-tolymercurichloride. A mixture of more than one aromatic mercury compound may be employed.

The third component, the finely divided vanadium oxide, is preferably vanadium pentoxide. However, equivalent results are obtained using other oxides, for example, vanadium trioxide.

The state of subdivision of the vanadium oxide can vary between fairly wide limits, and can, for example, be such that the average particle diameter is in the range of 0.01 to 5 microns, for example, 0.02 to 2.5 microns. Particle sizes in the range of 0.1 to 1.5 microns, for instance, 0.5 micron are often particularly effective.

A preferred polymerization catalyst system is a combination of aluminum bromide, diphenylmercury, and vanadium pentoxide.

The process of the invention can advantageously be employed in the polymerization of a wide variety of ethylenically unsaturated hydrocarbons, although it is particularly useful in polymerizing olefins, such as ethylene and propylene. Other olefins which can be used include, for example, the butylenes, pentenes and heptenes. Moreover, the ethylenically unsaturated hydrocarbon can be a diene, for example, a butadiene such as 1:3-butadiene. Aromatic members of the specified class of hydrocarbons are the vinylidene benzenes, for example, styrene, alpha-methylstyrene, etc. More than one ethylenically unsaturated hydrocarbon can be polymerized at the same time, so that copolymerization takes place and a copolymer is formed. In this way there can be prepared, for example, an ethylene-propylene copolymer or a styrene-butadiene copolymer.

The process is particularly valuable for the production of solid polyethylenes and solid polypropylenes. For instance, polyethylenes of a wide range of physical properties can be produced, including those in the "medium density" range i.e., having a density at 22° C. between 0.92 and 0.935, and the "high density" range, i.e., having a density at 22° C. above 0.935. The high density range includes a polyethylene, of density 0.95 and above, that is very linear in character and begins to approach in some ways the properties of a polymethylene. The melting points of the higher density polyethylenes are higher than those of conventional thermal polyethylenes, and polyethylenes can for instance be obtained which have a Vicat softening point of at least 115° C., for example, 120° C., 130° C., or even higher.

Where the liquid medium is a saturated straight-chain hydrocarbon this can be, for example, n-hexane, n-octane, n-decane or n-dodecane. Very often, however, a saturated cyclic hydrocarbon is preferable; cyclohexane gives excellent results, although an analog such as, for example, methylcyclohexane can be employed.

The finely divided vanadium oxide is an insoluble component of the catalyst, and it exists as fine particles dispersed in the liquid medium both before and during the polymerization of the ethylenically unsaturated hydrocarbon. However, it has been found preferable to pre-treat or "age" the vanadium oxide in finely divided form in the presence of an ethylenically unsaturated hydrocarbon, preferably the one to be polymerized, before the other two catalyst components are added. The period of pre-treatment can vary from a few minutes, for instance, 3 minutes, to several hours. The limiting factor in this regard is an economic balance between the cost of "aging" and the benefits obtained therefrom. Good results are obtained with a pre-treatment period of from one to two hours. The effect during the subsequent polymerization is to obtain a very steady reaction rate. However, most importantly, the net result of this "aging" step is to increase the polymer yield for a given quantity of the catalyst mixture. Significant increases in polymer yield are realized within the entire range of proportions herein described. The examples heretofore presented and the table summarizing the results obtained amply demonstrate this increase in yield. After the pre-treatment and when the other components have been added the vanadium oxide is still insoluble in the liquid medium.

Regarding the proportions in which the aluminum and mercury components are employed in the catalyst, preferably a molar excess of the aluminum halide is present. Excellent results are obtained for instance where the molar ratio of the aluminum halide to the arylmercury compound is between 1:0.05 and 1:1, particularly between 1:0.2 and 1:0.4, for example, 1:0.3. The third component, the vanadium oxide, can be employed in a relatively small amount compared with the other two components, and what is virtually only a trace of a vanadium oxide such as vanadium pentoxide can result in a very efficient catalyst mixture. For instance, the molar ratio of the aluminum halide to the vanadium oxide can usefully be from 1:0.005 or 1:0.01 to 1:0.5. Good results are obtained in the range from 1:0.05 to 1:0.3, for example, 1:0.1. Larger amounts of the vanadium oxide can be present, for example, the molar ratio can even be as high as 1:1, but there is not normally much advantage to be obtained by this means.

Owing to the activity of the catalyst employed the process of the invention can be operated under relatively low pressures and at temperatures close to atmospheric, with all the advantages attendant on this. Thus, the polymerization can be usefully conducted between 15° and 35° C., say between 20° and 40° C. Temperatures both lower (for instance, from 5° to 15° C.) and somewhat higher (for instance, up to 50° C.) can, however, be effective in certain instances. The pressure can be as low as 1 atmosphere, but can conveniently be up to at least 30 to 50 atmospheres. Often it is preferable to use pressures up to several hundreds of atmospheres, for example, 200 atmospheres, pressures which are still relatively "low" compared with those needed in making what is known as high pressure or thermal polyethylene.

Preferably the process is operated under anhydrous conditions, since in general water will interfere with the catalyst employed. Small quantities of water can, however, be tolerated. The presence of small amounts of oxygen, for instance, in the form of air does not appear to effect adversely the course of the polymerization.

In a typical procedure the dry ethylenically unsaturated hydrocarbon in gas or vapor form is passed into a slurry of the vanadium oxide in the liquid medium under anhydrous conditions. However, the liquid medium may be omitted at this step by contacting the vanadium oxide directly with the gaseous or liquid ethylenically unsaturated hydrocarbon. After "aging" for the desired period the remaining catalytic components, i.e., the aluminum halide, the arylmercury compound, and the liquid medium, if omitted earlier, are added. As shown in the examples, the liquid medium may be used as solvent for the aluminum halide or the arylmercury compound, or both, and thus be added simultaneously with these components. It is desirable that the system be agitated while the polymerization is taking place. The polymerization product can be recovered by washing the catalyst-containing mixture with a liquid that will dissolve the catalyst, for example, in suitable instances water, hydrochloric acid, methanol, ethanol, or mixtures of these materials. The polymerization product is finally filtered off and dried.

This process lends itself equally adaptable to either batch or continuous operation. In the latter, the vanadium oxide is contacted with an initial portion of the ethylenically unsaturated hydrocarbon for the desired "aging" period, then the remaining catalytic components are added, and the liquid medium if not already present. Polymerization is then effected while incrementally or continuously adding further ethylenically unsaturated hydrocarbon.

It is obvious that many variations may be made in the processes set forth above without departing from the spirit and scope of this invention.

What is claimed is:

1. A process for preparing a solid polymeric material which comprises contacting an ethylenically unsaturated hydrocarbon with a finely divided vanadium oxide for a period of at least 3 minutes, subsequently adding an aluminum halide and an arylmercury compound, and subsequently effecting polymerization of the ethylenically unsaturated hydrocarbon at a temperature of from 5 to 50° C. in the presence of a liquid medium added at least prior to effecting polymerization; said vanadium oxide and said arylmercury compound being present in proportions of from 0.005 to 1.0 mol and from 0.05 to 1.0 mol, respectively, per mol of the aluminum halide; said ethylenically unsaturated hydrocarbon being selected from the group consisting of an olefin containing 2–7 carbon atoms, butadiene, styrene, alpha-methylstyrene, and mixtures thereof; said vanadium oxide being selected from the group consisting of vanadium trioxide and vanadium pentoxide; said arylmercury compound being selected from the group consisting of diphenylmercury, di(p-tolyl)mercury, phenylmercurichloride, p-tolylmercurichloride, and mixtures thereof; said liquid medium being selected from the group consisting of saturated straight-chain hydrocarbons and saturated cyclic hydrocarbons.

2. A process as in claim 1 wherein the ethylenically unsaturated hydrocarbon is a mixture of interpolymerizable ethylenically unsaturated hydrocarbons and the vanadium oxide is contacted with the ethylenically unsaturated hydrocarbon for a period of between about 3 minutes and about 90 minutes prior to effecting polymerization.

3. A process as in claim 1 wherein the ethylenically unsaturated hydrocarbon is ethylene and the vanadium oxide is contacted with the ethylenically unsaturated hydrocarbon for a period of between about 3 minutes and about 90 minutes prior to effecting polymerization.

4. A process as in claim 3 wherein the aluminum halide is aluminum bromide and the vanadium oxide is contacted with the ethylenically unsaturated hydrocarbon for a period of between about 3 minutes and about 90 minutes prior to effecting polymerization.

5. A process as in claim 3 wherein the arylmercury compound is diphenylmercury and the vanadium oxide is contacted with the ethylenically unsaturated hydrocarbon for a period of between about 3 minutes and about 90 minutes prior to effecting polymerization.

6. A process as in claim 3 wherein the vanadium oxide is vanadium pentoxide and the vanadium oxide is contacted with the ethylenically unsaturated hydrocarbon for a period of between about 3 minutes and about 90 minutes prior to effecting polymerization.

7. A process for preparing a solid polymeric material which comprises contacting an ethylenically unsaturated hydrocarbon with a finely divided vanadium oxide for a period of at least 3 minutes, subsequently adding an aluminum halide and an arylmercury compound, and subsequently effecting polymerization of the ethylenically unsaturated hydrocarbon at a temperature of from 5 to 50° C. in the presence of a liquid medium added at least prior to effecting polymerization while at least incrementally adding further ethylenically unsaturated hydrocarbon throughout the polymerization step; said vanadium oxide and said arylmercury compound being present in proportions of from 0.005 to 1.0 mol and from 0.05 to 1.0 mol, respectively, per mol of the aluminum halide; said ethylenically unsaturated hydrocarbon being selected from the group consisting of an olefin containing 2–7 carbon atoms, butadiene, styrene, alpha-methylstyrene, and mixtures thereof; said vanadium oxide being selected from the group consisting of vanadium trioxide and vanadium pentoxide; said arylmercury compound being selected from the group consisting of diphenylmercury, di(p-tolyl)mercury, phenylmercurichloride, p-tolylmercurichloride, and mixtures thereof; said liquid medium being selected from the group consisting of saturated straight-chain hydrocarbons and saturated cyclic hydrocarbons.

8. A process as in claim 7 wherein the ethylenically unsaturated hydrocarbon is a mixture of interpolymerizable ethylenically unsaturated hydrocarbons and the vanadium oxide is contacted with the ethylenically unsaturated hydrocarbon for a period of between about 3 minutes and about 90 minutes prior to effecting polymerization.

9. A process as in claim 7 wherein the ethylenically unsaturated hydrocarbon is ethylene and the vanadium oxide is contacted with the ethylenically unsaturated hydrocarbon for a period of between about 3 minutes and about 90 minutes prior to effecting polymerization.

10. A process as in claim 9 wherein the aluminum halide is aluminum bromide and the vanadium oxide is contacted with the ethylenically unsaturated hydrocarbon for a period of between about 3 minutes and about 90 minutes prior to effecting polymerization.

11. A process as in claim 9 wherein the arylmercury compound is diphenylmercury and the vanadium oxide is contacted wtih the ethylenically unsaturated hydrocarbon for a period of between about 3 minutes and about 90 minutes prior to effecting polymerization.

12. A process as in claim 9 wherein the vanadium oxide is vanadium pentoxide and the vanadium oxide is contacted with the ethylinically unsaturated hydrocarbon for a period of between about 3 minutes and about 90 minutes prior to effecting polymerization.

13. A process for preparing a solid polymeric material which comprises contacting ethylene with finely-divided vanadium pentoxide for a period of between about 3 minutes and about 90 minutes, subsequently adding aluminum bromide and diphenylmercury, and subsequently effecting polymerization of the ethylene at a temperature of 5–50° C. in the presence of a liquid medium added at least prior to effecting polymerization; said vanadium pentoxide and diphenylmercury being present in respective proportions of 0.005–1.0 mol and 0.05–1.0 mol per mol of aluminum bromide; said liquid medium being selected from the group consisting of saturated straight-chain hydrocarbons and saturated cyclic hydrocarbons.

14. A process for preparing a solid polymeric material which comprises contacting ethylene with finely-divided vanadium pentoxide for a period of at least 3 minutes, subsequently adding aluminum bromide and diphenylmercury, and subsequently effecting polymerization of the ethylene at a temperature of 5–50° C. in the presence of a liquid medium added at least prior to effecting polymerization while at least incrementally adding further ethylene throughout the polymerization step; said vanadium pentoxide and diphenylmercury being present in respective proportions of 0.005–1.0 mol and 0.05–1.0 mol per mol of aluminum bromide; said liquid medium being selected from the group consisting of saturated straight-chain hydrocarbons and saturated cyclic hydrocarbons.

15. A process as in claim 13 wherein the liquid medium is cyclohexane and the vanadium oxide is contacted with the ethylenically unsaturated hydrocarbon for a period of between about 3 minutes and about 90 minutes prior to effecting polymerization.

16. A process as in claim 14 wherein the liquid medium is cyclohexane and the vanadium oxide is contacted with the ethylenically unsaturated hydrocarbon for a period of between about 3 minutes and about 90 minutes prior to effecting polymerization.

References Cited by the Examiner

UNITED STATES PATENTS

| | | | |
|---|---|---|---|
| 3,054,784 | 9/1962 | Volans | 260—94.9 |
| 3,076,796 | 2/1963 | Carrick et al. | 260—94.9 |

OTHER REFERENCES

Gaylord et al., Linear and Stereoregular Addition Polymers, Interscience Publishers, New York, N.Y., June 1959, page 494.

JOSEPH L. SCHOFER, *Primary Examiner.*

LESLIE GASTON, *Examiner.*